Figure 1:
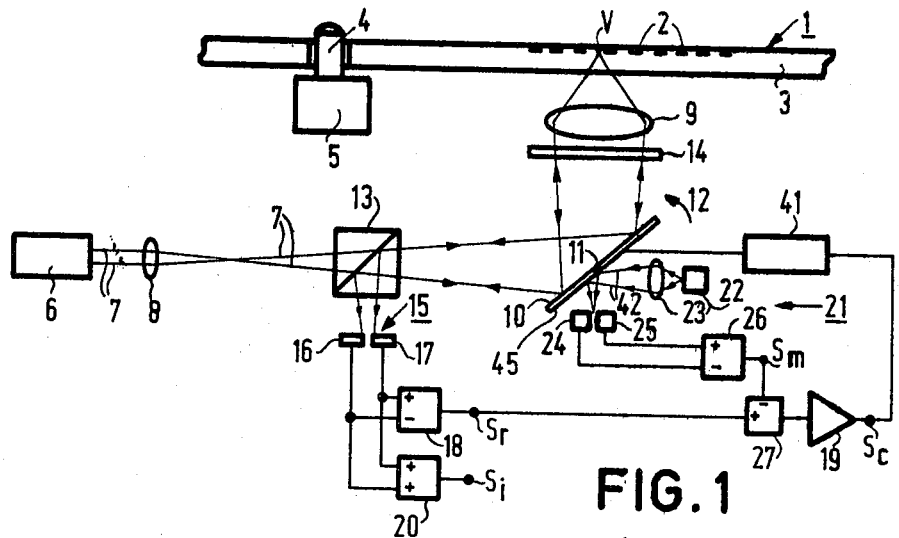

United States Patent [19]

Opheij et al.

[11] 4,423,496

[45] Dec. 27, 1983

[54] APPARATUS FOR READING AND/OR WRITING AN OPTICALLY READABLE INFORMATION STRUCTURE

[75] Inventors: Willem G. Opheij; Gerard E. Van Rosmalen, both of Eindhoven, Netherlands

[73] Assignee: U.S. Philips Corporation, New York, N.Y.

[21] Appl. No.: 214,938

[22] Filed: Dec. 10, 1980

[30] Foreign Application Priority Data

Oct. 13, 1980 [NL] Netherlands .................. 8005633

[51] Int. Cl.$^3$ .................. G11B 7/00; G11B 21/10
[52] U.S. Cl. .................. 369/46; 369/44; 250/202
[58] Field of Search .................. 369/46, 44, 111; 250/202, 578; 350/6.5; 358/206; 346/109; 318/577

[56] References Cited

U.S. PATENT DOCUMENTS

| | | | |
|---|---|---|---|
| 3,731,098 | 5/1973 | Hunt | 250/234 |
| 3,931,459 | 1/1976 | Korpel | 369/44 |
| 4,063,287 | 12/1977 | Van Rosmalen | 369/44 |
| 4,123,146 | 10/1978 | Dragt | 350/6.5 |
| 4,236,232 | 11/1980 | Jansen | 369/44 |
| 4,344,165 | 8/1982 | Akiyama | 369/44 |

*Primary Examiner*—Alan Faber
*Attorney, Agent, or Firm*—Thomas A. Briody; Robert T. Mayer; Algy Tamoshunas

[57] ABSTRACT

An apparatus for reading and/or writing an optically readable information structure, arranged in information tracks, on a record carrier, comprises a beam deflection element which is controlled by a control signal obtained from a tracking servo system. The apparatus is provided with a position detection system for detecting the position of the deflection element, and the signal from this detection system is applied to an input of the servo system for generating a control signal which is independent of the position of the deflecting element.

7 Claims, 3 Drawing Figures

APPARATUS FOR READING AND/OR WRITING AN OPTICALLY READABLE INFORMATION STRUCTURE

The invention relates to an apparatus for reading and/or writing an optically readable track-wise arranged information structure on a record carrier, which apparatus comprises a radiation source which produces an optical beam, an objective system for focusing the beam to a radiation spot in the plane of the information structure, an adjustable element for moving the radiation spot transversely of the track direction, and a tracking servo-system for generating a control signal for the adjustable element.

The adjustable element may be constituted by a separate element, such a pivotable mirror or a pivotable prism, or by an element which is already present in the radiation path and whose position is adjustable. Examples are an objective system which is movable transversely of the track direction or a radiation source, for example a diode laser, which is movable transversely of the track direction.

A tracking servo system is to be understood to mean a system for determining a deviation between the centre of the radiation spot and the centre of a track portion to be read or written and for generating a control signal which is proportional to said deviation.

Such apparatus, for reading a record carrier in which a video program is stored is known, inter alia from U.S. Pat. No. 3,931,459. The tracking servo system described therein comprises two radiation-sensitive detectors which are arranged in the far field of the information structure, namely one on each side of a line which is parallel to the track direction. The difference between the output signals of these detectors represents the magnitude and the direction of the deviation in the position of the read spot relative to the centre of an information track to be read. This signal, as the case may be after amplification, is applied to a drive element for a pivotable mirror, arranged between the radiation source and the objective system, by means of which mirror the position of the read spot can be corrected.

The apparatus described in U.S. Pat. No. 3,931,459 is intended for reading a radiation-transmitting record carrier, the pivotable mirror being arranged on one side and the tracking detectors on the other side of the record carrier. When the mirror is pivoted out of its centre position the orientation of the beam axis is changed and thus changing the position of that axis relative to the tracking detectors. A similar effect occurs in an apparatus for reading a radiation-reflecting record carrier in which a pivotable semitransparent element is employed for positioning the radiation spot and in which the beam portion which is reflected by the information structure and transmitted by the semitransparent element is employed for tracking detection. In apparatus for reading a radiation-reflecting record carrier, employing a pivotable and fully reflecting mirror for positioning the radiation spot, the beam axis will be moved relative to the tracking detectors upon a pivotal movement of the mirror, if this mirror is not disposed exactly in the focal plane of the objective system. If in the last-mentioned apparatus the pivotable mirror is situated in the focal plane of the objective system, but if the intensity distribution within the beam is asymmetrical, for example if the radiation source is a diode laser, a pivotal movement of the mirror results in a change in the intensity distribution over the tracking detectors, which change is independent of the position of the radiation source relative to an information track to be read. If the radiation spot is moved transversely of the track direction by moving the objective system or the radiation source, this movement results in a shift of the beam axis relative to the tracking detectors, which shift is independent of the position of the radiation spot relative to the centre of an information track.

In all such apparatus for writing and/or reading, the tracking signal generated by means of the tracking detectors is dependent not only on the position of the read spot relative to an information track to be read but also on the position of the adjustable element for moving the radiation spot transversely of the track direction. As a result of this, the read spot may be set to a position which does not coincide with the centre of an information track to be read, that is: the centre of the read spot travels off the centre of the information track. If the change in position of the adjustable element is great, to follow information tracks with large eccentricities, the influence of said change on the intensity distribution over the tracking detectors may even be greater than that of the deviation between the centre of the read spot and the centre of the information track.

The position of the adjustable element is the angular position of a pivotable element or the position of a translatable element transverse of the optical axis of the the system constituted by the other elements in the radiation path.

It is the object of the present invention to provide a read and/or write apparatus in which the influence of the position of the adjustable element on the control signal for this element can be eliminated. To this end, the apparatus in accordance with the invention is characterized by a position detection system for determining the position of the adjustable element, the output of said detection system being connected to an input of the tracking servo system, for generating a control signal which is corrected with respect to said position.

The invention will now be explained by a more detailed description, by way of example, of an apparatus for reading a radiation-reflecting record carrier.

Figure 2:
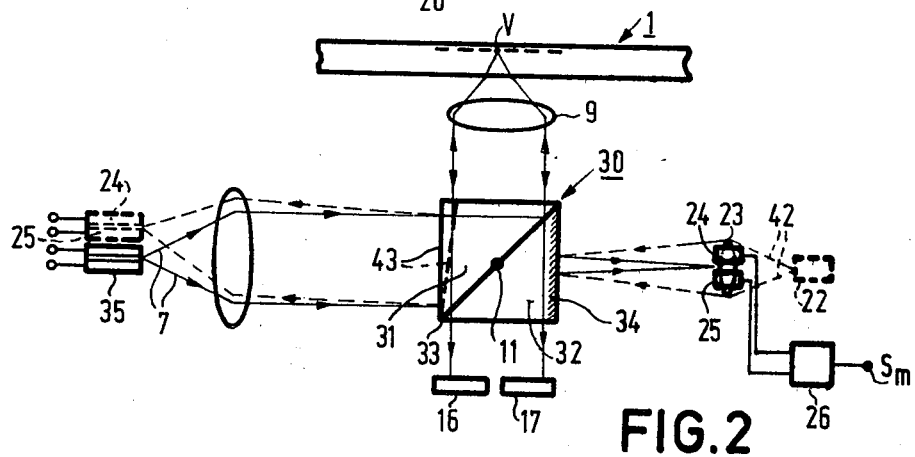
Figure 3:
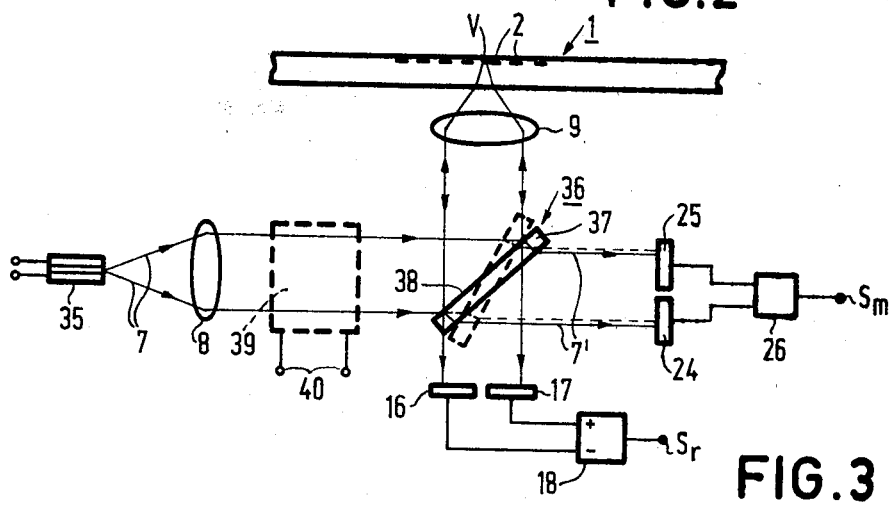

FIGS. 1, 2 and 3 show various embodiments of such an apparatus in accordance with the invention.

FIG. 1 shows a record carrier 1 in radial cross-section. The information structure comprises a multitude of information tracks 2, which in turn comprise information areas, not shown, which alternate with intermediate areas. The information structure may be disposed on the upper side of the record carrier, so that reading is effected through the transparent substrate 3 of the record carrier, the substrate serving as a protective layer. The information structure is illuminated by a read beam 7 produced by a radiation source 6, for example a helium-neon laser. The beam 7 is focused to a read spot V at the information structure by means of an objective system 9, which is schematically represented by a single lens.

The radiation path includes a beam-deflecting element. This element takes the form of a mirror 10, which is pivotable about its axis 11 in the direction of the arrow 12 with the aid of the schematically represented actuator 41. The mirror 10 may for example be driven by arranging a winding around said mirror, which winding is disposed in a magnetic field produced by a pair of pole pieces. By passing an electric current through the winding the pivotal movement of the mirror can be accelerated or decelerated. Such a mirror drive is for example described in U.S. Pat. No. 4,123,146.

The beam which is reflected by the information structure traverses the objective system for a second time and is subsequently reflected in the direction of the radiation source 6 by the mirror 10. In order to separate the reflected beam, which is modulated by the information structure, from the beam emitted by the source 6 a polarization-sensitive splitting prism 13 and a λ/4 plate 14, λ being the wavelength of the read beam, may be arranged in the radiation path in known manner. The prism 13 reflects the beam from the record carrier to a radiation-sensitive detection system 15. When the record carrier is rotated by means of a spindle 4, which is driven by a motor 5, the output signal of the detection system will vary in accordance with the sequence of information areas and intermediate areas in an information track.

In order to detect the position of the read spot relative to an information track to be read the detection system 15 comprises two detectors, for example photodiodes 16 and 17, which are arranged in the so-called "far-field" of the information structure. This means that the detectors are disposed in a plane in which the centres of the various diffraction orders, which are formed when the read spot is projected on a small information area, are sufficiently spaced from each other. The detectors may for example be situated in an image of the entrance pupil of the objective system. As described in U.S. Pat. No. 3,931,459, the intensity distribution over the detectors 16 and 17 is determined by the position of the read spot V relative to the centre of an information track 2 to be read. The output signals of the detectors 16 and 17 are applied to a substractor circuit 18, whose output signal or tracking signal $S_r$ is then determined by the magnitude and the direction of a deviation between the centre of the read spot and the centre of the information track to be read. This signal is applied to an actuator 41, as the case may be via an amplifier 19, for pivoting the mirror 10 in such a way that the signal $S_r$ becomes zero.

A signal $S_i$, which is a representative of the information being read, is obtained by adding the signals from the detectors 16 and 17 in the circuit 20.

For practical reasons it is generally not possible to arrange the centre of the mirror 10 in the focal plane of the objective system. The position of the beam which is reflected by the record carrier and the mirror 10, and thus the position of the beam which is incident on the detectors 16 and 17, will then be dependent on the position of the mirror 10, so that the intensity distribution over the detectors 16 and 17 is also determined by the position of the mirror 10. If the intensity distribution within the beam emitted by the source 6 is asymmetrical, the intensity distribution over the detectors 16 and 17 will also depend on the position of the mirror 10, even if the centre of the mirror 10 is disposed in the focal plane of the objective system. In such cases the tracking signal $S_r$, and thus the control signal $S_c$, is consequently dependent on the position of the mirror 10.

In order to eliminate this dependence, the apparatus is provided with an angular-position detection system 21. This system comprises a radiation source 22, for example a light-emitting diode, which emits a beam 42, a lens 23 and two detectors 24 and 25, for example photodiodes. The rear surface 45 of the mirror 10 is made reflecting and directs the beam emitted by the source 22 to the plane of the detectors 24 and 25, the beam being focused in said plane by the lens 23. The system may be adapted so that, if the mirror 10 is in its centre position, the beam 42 is symmetrical relative to the detectors 24 and 25. When the mirror 10 is pivoted about its centre position the direction of the reflected beam 42 is changed, so that one of the detectors 24 or 25 receives more radiation than the other. The signals from the detectors 24 and 25 are applied to a subtractor circuit 26. The output signal $S_m$ of this circuit depends on the magnitude and the direction of the pivoting angle of the mirror 10. This signal, which is equal to that component in the signal $S_r$ which is caused by the pivotal movement of the mirror 10, is applied to a subtractor circuit 27, which also receives the signal $S_r$. The output signal $S_c$ of the circuit 27 is then independent of the angular position of the mirror 10.

With respect to the dependence of the signal $S_r$ on the position of the element 10, which in turn positions the read spot V, the apparatus of FIG. 1 may be compared with an apparatus in which the objective system or the radiation source is moved in order to position the read spot transversely of the track direction. The movement of the objective system or the radiation source transverse of the track direction can be measured in known manner, for example, by means of an inductive transducer or optically by arranging a mirror on the objective system or the radiation source and having a radiation beam impinge on said mirror at an acute angle. In the path of the beam which is reflected by the mirror, two radiation-sensitive detectors are arranged in such a way that if the objective system or the radiation source moves transversely of the track direction the beam travels over said detectors transversely of the bounding line of these detectors.

In the apparatus shown in FIG. 1, the dependence of the signal $S_r$ on the position of the element which positions the read spot is smaller than in an apparatus for reading a radiation-transmitting record carrier or in the apparatus shown in FIG. 2, in which that part of the beam reflected by the record carrier which passes through the beam-deflection element 30 is used for tracking detection. In FIG. 2 the deflection element 30 also functions as beam splitter. This element comprises two components 31 and 32, between which a beam-splitting layer 33 is inserted and which are combined to form a cube. For a given degree of rigidity such a deflection element has a smaller mass inertia than a plane mirror of the same rigidity and can be moved without the occurrence of any substantial parasitic resonances, which is advantageous for reasons of control technology. Moreover, the beam-splitting layer is now fully enclosed, so that this layer is not exposed to atmospheric influences and mechanical damage. The beam-splitting layer 33 may be constituted by a partly reflecting layer or by a polarization-sensitive layer, in which last-mentioned case a λ/4 plate should be arranged before the objective system. The cube 30 can be pivoted by electromagnetic means, not shown. Suitably, said means may be of the type described in the previous non-prepublished Netherlands Patent Application No. 80 02958 corresponding to U.S. application Ser. No. 197,451, filed Oct. 16, 1980, which is herewith incorporated by reference.

The rear surface 34 of the cube 30 is made reflecting and via the position of this surface the angular position of the layer 33 is detected with the aid of the radiation source 22, the lens 23, the detectors 24 and 25 and the subtractor circuit 26 in the same way as in the apparatus of FIG. 1.

In order to ensure that the signal $S_m$ depends solely on the pivotal movement of the surface 34 and not on any other movements of the cube 34, for example a movement of this cube in the direction of the source 35, the elements of the position-detection system are arranged so that the centre of the source 22 and the bounding line of the detectors 24 and 25 are disposed in one plane which is parallel to the pivoting axis 11 of the cube. In FIG. 2 the radiation source 22 and the lens 23 are for example situated behind the plane of drawing, as is represented by the dashed lines, whilst the detectors 24 and 25 are then situated before the plane of drawing. In the apparatus of FIG. 1 the arrangement of the elements 22, 23, 24 and 25 relative to the pivoting axis 11 may be similar to that shown in FIG. 2.

In the apparatus of FIG. 2 the radiation source is constituted by a semiconductor diode laser. Such a radiation source may also be used in the apparatus of FIG. 3. In this apparatus the deflection element 36 again functions as beam splitter. Said element comprises a plane-parallel transparent plate 37 which is provided with a partly reflecting layer 38.

In the apparatus of FIG. 3, the position detection system does not have a separate radiation source, but instead the portion 7' of the read beam 7 which is transmitted by the layer 38 is employed for position detection and is incident on the two detectors 24 and 25. The beam portion 7' is shifted parallel to its axis by the plate 37, the displacement being a function of the angle of incidence of the beam 7 on the plate 37. If the plate 37 is for example in its centre position, the beam portion 7' passes through the plate 7, traverses the path indicated by the solid lines and is symmetrically incident on the detectors 24 and 25. The dashed lines represent the path of the beam portion 7' if the plate 37 has pivoted counter-clockwise. Instead of a plane-parallel plate 37 it is alternatively possible to employ a cube in the apparatus of FIG. 3.

For detecting the position of the deflection element it is alternatively possible to employ the small amount of radiation which is reflected at the front surface 43 of the cube 30. Said front surface 43 then makes a small angle with the axis of the beam 7, as indicated by the dashed lines in FIG. 2. The radiation reflected by the surface 43 is focused by the lens 8 to a radiation spot in the plane of the detectors 24 and 25, represented by dashed lines, of the position detection system. If the source 35 is a diode laser the detectors 24 and 25 may be integrated together with said source on one wafer of a semiconductor material.

If the adjustable element is driven by a magnetic coil, whose impedance or self-inductance is in a fixed relationship with the position of said element, the position of the adjustable element can be derived electronically from the self-inductance.

The invention may also be applied to an apparatus for writing information in a record carrier body which is provided with an optically detectable servo track, in which or adjacent which the information is to be inscribed. Such a write apparatus may be constructed similarly to the read apparatus described above, for example, that of FIG. 3, except that the radiation source would emit a higher intensity beam than that which suffices for reading. The radiation path, if the radiation source is for example a gas laser, should include an intensity modulator 39, for example, an acousto-optical or a magneto-optical modulator, to whose input terminals 40 the signal to be recorded, which may be an audio, a video or a data signal, is applied. If the radiation source is a diode laser, no modulator is required and the diode laser can be driven by the audio, video or data signal. Steps are taken to ensure that the beam splitter 38 reflects most of the radiation and transmits only a small part. During writing the record carrier body also reflects sufficient radiation to enable the tracking described in the foregoing.

What is claimed is:

1. An apparatus for reading and/or writing an optically readable track-wise arranged information structure on a record carrier, which apparatus comprises a radiation source which produces an optical beam, an objective system for focusing the beam to a radiation spot in the plane of the information structure, an adjustable element for moving the radiation spot transversely of the track direction, and a tracking servo system for generating a control signal for the adjustable element, said servo system including a first detection system for detecting deviations of the spot transversely of the track direction, said first detection system producing a tracking signal indicative of said deviations, characterized by a position detection system (21, 22, 23, 24, 25, 26) for determining the position of the adjustable element (10, 30, 36), the output of said position detection system being connected to an input of the tracking servo system (16, 17, 18, 27) so that the control signal ($s_c$) is generated in dependence on the tracking signal and is corrected with respect to said position.

2. An apparatus as claimed in claim 1, in which the adjustable element is constituted by a pivotable, partly reflecting element, characterized in that the position-detection system comprises two radiation-sensitive detectors (24, 25) arranged in the path of the beam portion (7') which is emitted by the radiation source (35) and transmitted by the pivotable element (36), the outputs of said detectors being connected to a subtractor circuit (26).

3. An apparatus as claimed in claim 1, in which the adjustable element comprises a pivotable prism in which a partly reflecting surface is arranged, characterized in that the surface (43) of the prism (30) which is directed to the radiation source (35) makes an acute angle with the axis of the beam (7) emitted by the radiation source, and that the position-detection system comprises two radiation-sensitive detectors (24, 25) arranged in the path of the beam portion reflected by said surface (43) of the prism, and a subtractor circuit (26) whose inputs are connected to the outputs of the detectors.

4. An apparatus as claimed in claim 1, in which the adjustable element is constituted by a pivotable, at least partly reflecting element, characterized in that a surface (45, 34) of the pivotable element (10, 30), which surface is remote from the radiation source, is reflecting and that the position detection system comprises an auxiliary radiation source (22) and two radiation-sensitive detectors (24, 25) arranged in the path of the beam (42) which is emitted by the auxiliary radiation source and reflected by the reflecting surface (45, 34), the outputs of said detectors being connected to the inputs of a subtractor circuit (26), and that the auxiliary radiation source and the boundary line of detectors are disposed in one plane which is parallel to the pivoting axis (11) of the pivotable element.

5. An apparatus for reading and/or writing optically readable information on a record carrier having at least one optically detectable elongated track, said apparatus comprising means for producing a beam of radiation, means for focussing said beam to a spot on said record carrier, means for producing relative movement between said spot and the record carrier in a direction generally parallel to the longitudinal direction of the track, movably supported means for moving said spot relative to the record carrier in a direction transverse of the track, and means for controlling the movement of said movable means so as to maintain said spot at a predetermined position relative to the track, said controlling means including first means for detecting the position of said spot relative to the track, said first means producing a tracking signal indicative of deviations of the position of said spot from said predetermined position in said transverse direction, second means for determining the position of said movable means, and means responsive to said second means for correcting said tracking signal so as to reduce the dependence thereof on the position of said movable means to thereby produce a control signal for controlling the movement of said movable means.

6. The apparatus according to claim 5, wherein said movable means includes a pivotable beam deflecting element arranged in the path of said beam so as to move said spot in said transverse direction upon pivotal movement of said element, said second means includes means for producing a second signal which is dependent on the position of said beam deflecting element and said correcting means includes means for deriving a third signal representative of the difference between said tracking and second signals, said third signal defining said control signal.

7. The apparatus according to claim 6, wherein said beam deflecting element has a reflective surface and wherein said second means includes means for directing an auxillary beam of radiation at said reflective surface and a radiation sensitive detector arranged in the path traversed by the auxillary beam upon reflection by said reflective surface, said detector producing said second signal in response to variations in the radiation incident thereon due to changes in the position of said beam deflecting element.

* * * * *